(12) United States Patent
Cain

(10) Patent No.: US 6,401,130 B1
(45) Date of Patent: Jun. 4, 2002

(54) AUTO AGGREGATION METHOD FOR IP PREFIX/LENGTH PAIRS

(75) Inventor: Brad Cain, Cambridge, MA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/227,390

(22) Filed: Jan. 8, 1999

(51) Int. Cl.[7] .............................................. G06F 15/16
(52) U.S. Cl. ........................ 709/245; 709/241; 709/238; 712/210; 370/392
(58) Field of Search ................................ 709/245, 202, 709/238, 241, 246; 712/210, 213; 370/392, 238; 341/67, 51

(56) References Cited

U.S. PATENT DOCUMENTS

| | | | | |
|---|---|---|---|---|
| 5,751,971 A | * | 5/1998 | Dobbins et al. ............ | 709/238 |
| 6,011,795 A | * | 1/2000 | Varghese et al. ............ | 370/392 |
| 6,052,683 A | * | 4/2000 | Irwin ............................. | 707/8 |
| 6,061,712 A | * | 5/2000 | Tzeng ........................ | 709/202 |
| 6,237,061 B1 | * | 5/2001 | Srinivasan et al. ......... | 711/108 |

* cited by examiner

*Primary Examiner*—Ario Etienne
(74) *Attorney, Agent, or Firm*—Blakely Sokoloff Taylor & Zafman, LLP

(57) ABSTRACT

A method, apparatus and article of manufacture for aggregating a sorted list of IP prefix pairs. A prefix pair in the list is compared to a lowest IP length subnet boundary. The prefix pair is added to a final list if the prefix pair is not on the lowest IP length subnet boundary and the prefix pair is not a first in pair. The prefix pair is moved to a next lower length list if the prefix pair is on the lowest IP length subnet boundary and the prefix pair is a next expected pair. A next higher list is selected, and the method is repeated until there are no more lists.

14 Claims, 3 Drawing Sheets

FIG. 2: IP Aggregation Example

AUTO AGGREGATION METHOD FOR IP PREFIX/LENGTH PAIRS

FIELD OF THE INVENTION

This invention relates generally to data communications networks, and more particularly, to an auto aggregation method for IP prefix/length pairs.

BACKGROUND OF THE INVENTION

Unicast Internet protocol (IP) subnets are described by an IP prefix and a subnet mask. With the introduction of classless inter-domain routing (CIDR), subnet masks must be contiguous, which allows consistent hierarchical addressing. This allows state requirements for Internet devices to be scalable, as large groups of addresses can be summarized into one entry. Because of the CIDR requirement for contiguous subnet masks, they can be described as an integer, which is the length of the mask.

In certain situations, such as a border gateway protocol (BGP) border, administrators usually configure a summarization of a set of IP subnets to be advertised. This is typically accomplished through manual configuration by an administrator. It is desirable to be able to automatically generate a summary of IP prefix/length pairs for auto-configuration. Situations where this is useful are generally on borders where summarization occurs. Example situations include borders within a given routing protocol, such as open shortest path first (OSPF) area border routers; borders between routing protocols, such as an OSPF or routing information protocol (RIP) border router; borders between autonomous systems, such as BGP-4 border router announce, and special cases such as BGP-4 border router "black-hole" routes.

The hard-coded aggregation state of manual configuration typically does not allow optimal path selection in certain scenarios where routes that are part of a summary have gone away. Therefore, there is a need for a way to automatically generate the largest possible set of aggregates given an set of IP prefix/length pairs.

SUMMARY OF THE INVENTION

The present invention provides a method, apparatus and article of manufacture for aggregating a sorted list of IP prefix pairs. A prefix pair in the list is compared to a lowest IP length subnet boundary. The prefix pair is added to a final list if the prefix pair is not on the lowest IP length subnet boundary and the prefix pair is not a first in pair. The prefix pair is moved to a next lower length list if the prefix pair is on the lowest IP length subnet boundary and the prefix pair is a next expected pair. A next higher list is selected, and the method is repeated until there are no more lists.

BRIEF DESCRIPTION OF THE DRAWINGS

The present invention is illustrated by way of example and may be better understood by referring to the following description in conjunction with the accompanying drawings, in which like references indicate similar elements and in which.

DETAILED DESCRIPTION OF AN EMBODIMENT OF THE PRESENT INVENTION

In the following description of a preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

The present invention provides way of aggregating a sorted list of IP prefix pairs. A prefix pair in the list is compared to a lowest IP length subnet boundary. The prefix pair is added to a final list if the prefix pair is not on the lowest IP length subnet boundary and the prefix pair is not a first in pair. The prefix pair is moved to a next lower length list if the prefix pair is on the lowest IP length subnet boundary and the prefix pair is a next expected pair. A next higher list is selected, and the method is repeated until there are no more lists.

The ability of the present invention to auto-aggregate prefix, length pairs provides the following advantages:

Reduced configuration time required by an administrator;
  Reduced liklihood that some possible aggregates will be omitted;
  If subnets are moved from area to area, no router re-configuration is needed;
  Elimintaion of suboptimal routing that may occur because of "hard-coded" aggregates.

In any situation where multiple routing protocol domains are connected, a border is formed which may or may not be an AS border. It is often desirable to aggregate prefixes from one domain to the next. The present invention can be used on a RIP/OSPF Border Router to aggregate the routes from one protocol before importing the routes into the other.

The Internet is loosely arranged as a hierarchy of domains. Stub domains connect to regional providers which then connect to backbone providers. At each border, summarization of routes typically occurs. It is useful in certain circumstances to use the present invention to allow a router to auto-aggregate prefixes.

Another BGP-4 circumstance exists where auto-aggregation is useful for an internal state that a router keeps. Often at a border router, a prefix is advertised but not every part of the advertised address space is used. If a default route also exists at the border router, then loops may occur if a packet arrives on the interface where the aggregate is advertised. This happens because a packet from an unknown internal subnet arrives, which is then sent towards the default route back in the direction from where the packet originated. To prevent this problem, administrators may configure "black-hole" static routes for subnets not yet in use. The present invention can be used to find the largest used blocks and automatically install these black hole routes.

Figure 1:
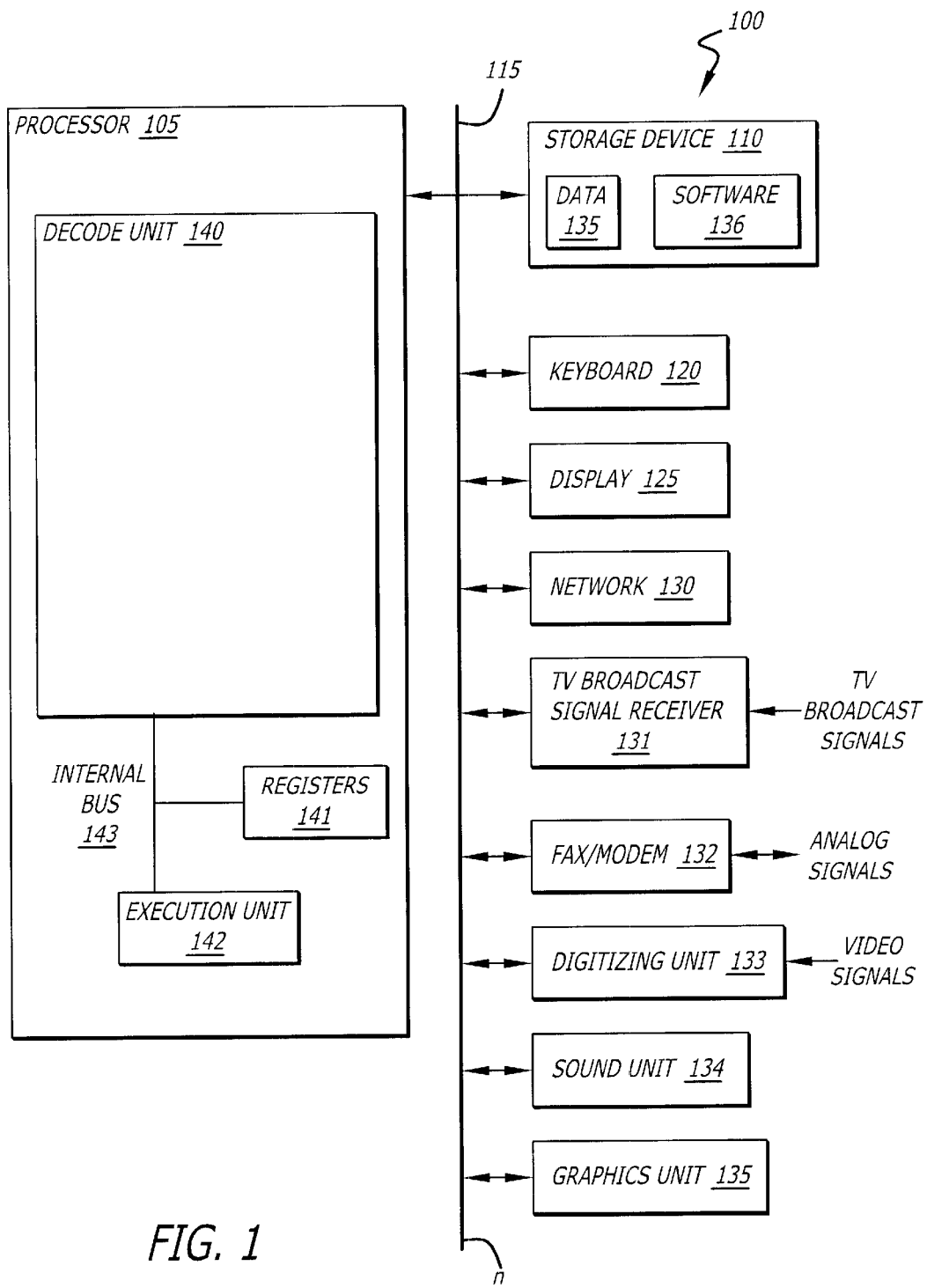
FIG. 1 shows system diagram which shows a computer hardware environment compatible with the present invention.

FIG. 1 illustrates one embodiment of a computer system 100 which implements the principles of the present invention. Computer system 100 comprises a processor 105, a storage device 110, and a bus 115. The processor 105 is coupled to the storage device 110 by the bus 115. In addition, a number of user input/output devices, such as a keyboard 120 and a display 125, are also coupled to the bus 115. The processor 105 represents a central processing unit of any type of architecture, such as CISC, RISC, VLIW, or hybrid architecture. In addition, the processor 105 could be implemented on one or more chips. The storage device 110 represents one or more mechanisms for storing data. For example, the storage device 110 may include read only memory (ROM), random access memory (RAM), magnetic disk storage mediums, optical storage mediums, flash memory devices, and/or other machine-readable mediums. The bus 115 represents one or more buses (e.g., AGP, PCI, ISA, X-Bus, VESA, etc.) and bridges (also termed as bus controllers). While this embodiment is described in relation to a single processor computer system, the invention could be implemented in a multi-processor computer system.

In addition to other devices, one or more of a network 130, a TV broadcast signal receiver 131, a fax/modem 132, a digitizing unit 133, a sound unit 134, and a graphics unit 135 may optionally be coupled to bus 115. The network 130 and fax modem 132 represent one or more network connections for transmitting data over a machine readable media (e.g., carrier waves). The digitizing unit 133 represents one or more devices for digitizing images (i.e., a scanner, camera, etc.). The sound unit 134 represents one or more devices for inputting and/or outputting sound (e.g., microphones, speakers, magnetic storage devices, optical storage devices, etc.). The graphics unit 135 represents one or more devices for generating 3-D images (e.g., graphics card).

FIG. 1 also illustrates that the storage device 110 has stored therein data 135 and software 136. Data 135 represents data stored in one or more of the formats described herein. Software 136 represents the necessary code for performing any and/or all of the techniques described with reference to FIGS. 3–6. It will be recognized by one of ordinary skill in the art that the storage device 110 preferably contains additional software (not shown), which is not necessary to understanding the invention.

FIG. 1 additionally illustrates that the processor 105 includes decode unit 140, a set of registers 141, and execution unit 142, and an internal bus 143 for executing instructions. It will be recognized by one of ordinary skill in the art that the processor 105 contains additional circuitry, which is not necessary to understanding the invention. The decode unit 140, registers 141 and execution unit 142 are coupled together by internal bus 143. The decode unit 140 is used for decoding instructions received by processor 105 into control signals and/or microcode entry nodes. In response to these control signals and/or microcode entry nodes, the execution unit 142 performs the appropriate operations. The decode unit 140 may be implemented using any number of different mechanisms (e.g., a look-up table, a hardware implementation, a PLA, etc.). While the decoding of the various instructions is represented herein by a series of if/then statements, it is understood that the execution of an instruction does not require a serial processing of these if/then statements. Rather, any mechanism for logically performing this if/then processing is considered to be within the scope of the implementation of the invention.

The registers 141 represent a storage are on processor 105 for storing information, including control/status information, integer data, floating node data, and packed data. It will be understood by one of ordinary skill in the art that one aspect of the invention is the described instruction set for operating on packed data. According to this aspect of the invention, the storage area used for storing the packed data is not critical. The term data processing system is used herein to refer to any machine for processing data, including the computer systems(s) described with reference to FIG. 1.

IPv4 subnets are typically described by a 32-bit IP address and an associated 32-bit subnet mask, which represents contiguous ones and thus can also be described as an integer. The subnet mask describes the number of bits in the IP address that represent the subnet portion of the address. A logical AND operations can be performed on the mask and the address to determine the IP subnet number.

Figure 2:
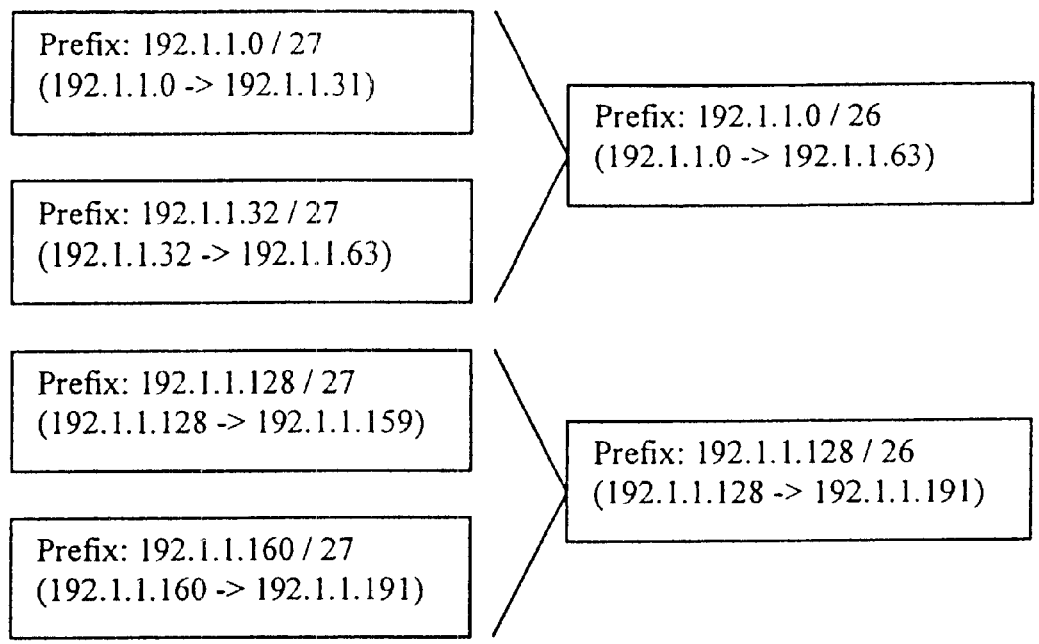
FIG. 2 shows an IP agregation example compatible with the present invention.

With the introduction of CIDR, a hierarchical addressing model can be implemented, because all subnet masks are contiguous and thus can be aggregated. Every two blocks of a given length that fall on a subnet boundary or are adjacent to each other can be aggregated to the next level of length. An example of aggregation is shown in FIG. 2. As shown in FIG. 2, prefixes with their associated mask lengths are shown with the range of addresses that they represent. Two sets of two of prefix length 27 are aggregated to prefix length 26.

The present invention takes any number of IP prefix and length pairs and returns a set of the greatest set of aggregated IP prefix/length pairs. The following constraints must be observed in implementing the invention:

1. Aggregation must begin at the longest length. This is because it is impossible to predict future aggregations without first performing aggregations at the lowest end of the hierarchy.
2. Given any two prefix/length pairs, it is desirable to be able to quickly tell if they are "adjacent".7
3. If two pairs are adjacent, it must be determined if they lie on a length boundary. If both conditions exist, then they can be aggregated. From the example above in FIG. 2, it will be noted that 192.1.1.64/26 and 192.1.1.128/26 are adjacent, but do not fall on a length boundary.
4. The present invention may be implemented recursively such that formed aggregates may be aggregated further.

A sorting operation based on IP prefix is typically required for implementing the invention. This allows a linear time complexity operation for moving through the list to find possible aggregates.

Figure 3:
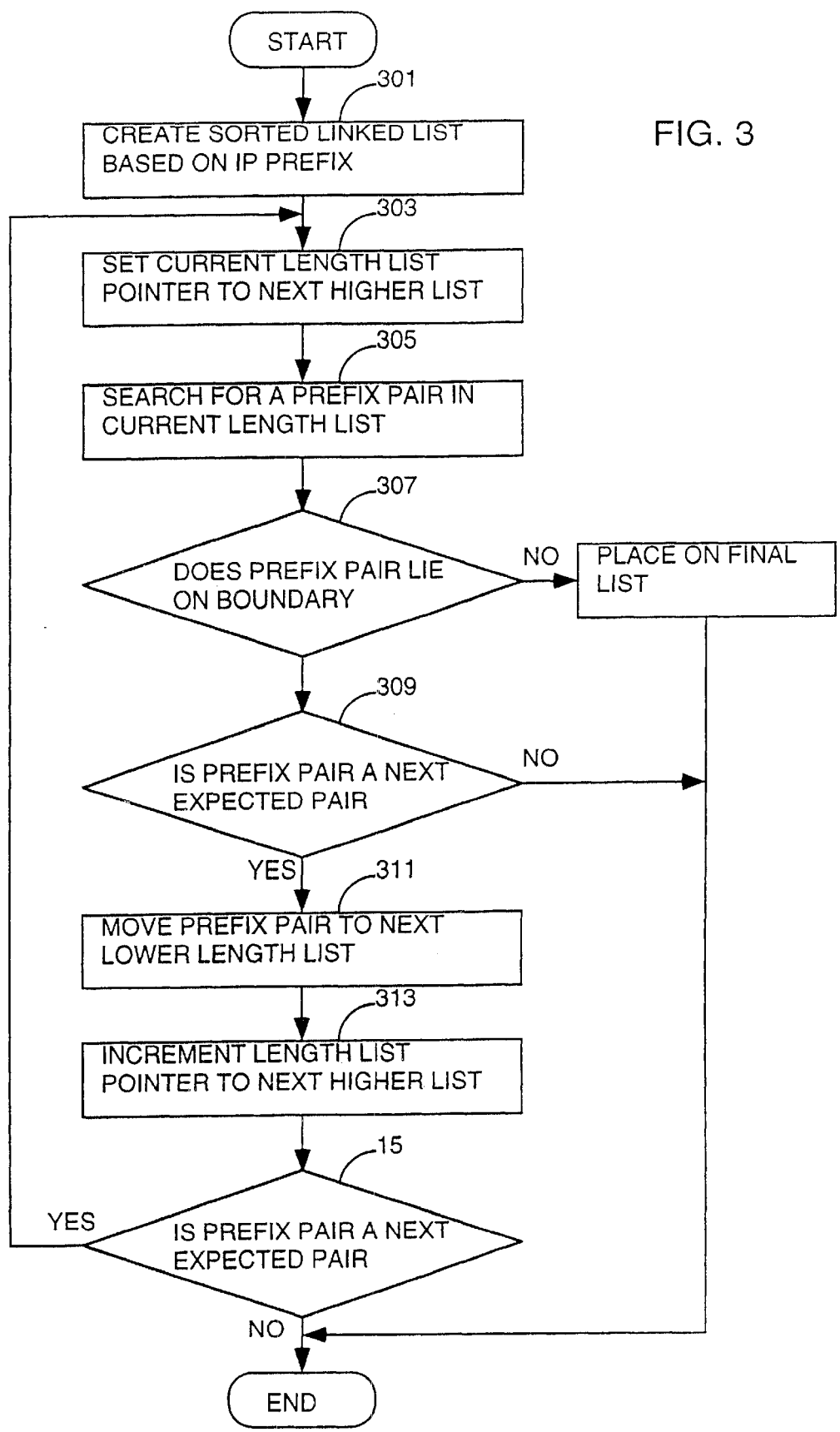
FIG. 3 shows flowchart for aggregating a sorted list of IP prefix pairs compatible with the present invention.

A flow chart of an embodiment of the present invention is show in FIG. 3. At step 301, a sorted linked list is created per prefix length, sorting based on the IP prefix. This operation will end with a list per prefix length in which the list is sorted per IP prefix. This can be performed with no copying, by using pointer manipulation. At step 303, a current length list pointer is set to the next highest length list. At step 305, starting with the current length list, the list is searched. At step 307, for each prefix, it is determined whether the prefix lies on the next lowest IP length subnet boundary. If so, it is a potential "first in pair". If not, and there is no current "first in pair", then it is not possible to aggregated the pair and the pair is placed on a "final list". At step 309, if the prefix pair is the next expected prefix from the "first in pair", then the prefix pair can be aggregated, and at step 311 the prefix pair is moved to the next lowest length list. At step 313, the list pointer is incremented to the next highest list. If at step 315 there are more lists, control returns to step 303.

For the purpose of explanation when analyzing the time complexity of the present invention, it is assumed that there are n prefixes to summarize, with k prefixes in each length. The first step of the present invention involves sorting n prefixes into k sub-lists. It is typical that this sorting operation can be performed in nlog(n) time using a logarithmic sorting algorithm. The remaining steps of the present invention involve traversing all sub-lists and finding aggregates which are repositioned into "lower" prefix lists. If no summaries are found at all, this step is bounded by O(n). If the maximal amount of summaries are found at every length, then the worst case is O(n+(n/2)−1). Therefore, the execution speed of the present invention is bounded by nlog(n).

Using the present invention with an OSPF Area Border Router minimizes configuration in routers where interfaces are configured into areas. Because of the possible overhead in implementing the present invention in border routers, several implementation switches may optionally be provided.

OSPF summary LSA's are generated by OSPF area border routers and sent into the backbone for all Router and Network LSA's within attached areas. The principle behind OSPF hierarchical routing is to reduce both the flooding and state required of routers. An implementation of the present invention in OSPF may optionally have the following switches for each backbone interface:

Turn auto-aggregation on or off;
Configure auto-aggregation to occur periodically or dynamically;
Configure a holddown timer for subtraction;
Configure a method to use for announcing a metric. This may be, but is not limited to, highest, lowest or reset and announce one;

Periodic aggregation means that the present invention runs periodically (e.g. every 30 minutes). Additional LSA's from attached areas are flooded individually into the backbone until the next run, after which they are flushed. If LSA's from an area are flushed, then there are two options: immediately run the algorithm and originate a set of most summarized routes, or start a holddown timer before running the algorithm.

Dynamic aggregation means that the present invention runs every time a new LSA or a flushed LSA is received. This keeps summarized LSA's always representative of what is reachable. The disadvantage of doing so is increased computation cost.

When an OSPF border router learns a new route in an attached area, it may either run the auto-aggregation algorithm to immediately see if the aggregate can be added into a area summary or it can perform the calculation at a later time when resources are available.

When an OSPF border router receives (or originates) a new LSA in an attached area, it performs the following if configured for immediate addition:

1. Run auto-aggregation algorithm to see if new route (i.e. subnet range) "fits" into existing summary for area
2. If yes, then announce new summary LSA (for area)
3. If no, announce separate summary for newly learned route When an OSPF border router receives (or originates) a new LSA in an attached area, it performs the following if configured for delayed addition:

1. Announce new route (LSA) as separate summary LSA
2. Mark new LSA
3. When resources are available, run auto-aggregation algorithm on marked LSAs to see if these ranges "fit" into existing summary
4. If yes, then announce a new summary LSA and withdraw initially announced separate summary LSA (for new route)
5. If no, do nothing When an OSFP border router receives (or originates) a withdraw for an LSA in an attached area, it may either:

1. Immediately re-run the algorithm to re-summarize routes in the area
2. Do nothing In the second case, if the deleted subnet is moved to another area, it will by definition not fit into the summary range of another area and will be announced separately. Because a separate more specific route will exist to this subnet in the backbone, no harm will be done. The first case requires that the algorithm be run more frequently. However, the first case will generally present a less confusing view of the network to the administrator.

An example source code listing for an embodiment of the present invention is given below.

```
// given a mask as binary, what is length (it just counts ones)
int Ip_Prefix_Length (u_long mask)
{
    int i=0;
    while ((mask & 1) != 1)
      { mask=mask>>1; i++; }
    return 32-i;
}
// data structure for everything
typedef struct ip_prefix {
    char *ip_addr;
    char *mask;
    int mask_len;
    u_long ip_addr_bin;
    u_long mask_bin;
    u_long ip_subnet_bin;
} IP_PREFIX;
// the number of IP prefix/mask pairs for testing
#define SIZE 6
// here is the test case for aggregation
const struct ip_prefix array[ SIZE ] = {
    { "192.1.1.1", "255.255.255.224"},
  { "192.1.1.33", "255.255.255.224"},
    { "192.1.1.65", "255.255.255.225"}, { "192.1.1.129", "255.255.255.224"},
    { "192.1.1.161", "255.255.255.224"}, { "192.1.1.225", "255.255.255.224"}
};
// define print function for LL
void Print (IP_PREFIX *p) {printf("%s   %s [ %i]   \n",p->ip_addr,p->mask,p->mask_len);}
// define compare function for sorted LL
int Compare (IP_PREFIX *p1, IP_PREFIX *p2) { return (p1->ip_addr_bin > p2->ip_addr_bin) ? 1 : 0; }
void main ( ) {
    // vars for linked list
    LINKED_LIST *listarray[ 33];
    LINKED_LIST *list_start;
    LINKED_LIST *list_end;
    IP_PREFIX *temp;
    IP_PREFIX *temp2;
    IP_PREFIX *firstg;
    int i;
    // vars for core algorithm and printing out results of it
    u_long firstingroup;
    char firstingrouptext[ 16];
    u_long netbinaddr;
    u_long maskbinaddr;
    u_long maskbinaddrback;
    u_long subnetbinaddr;
    u_long expectbinaddr;
    u_long upsubnetbinaddr;
    char *tmp;
    char subnet[ 16]=" ";
    char expect[ 16]=" ";
    char b[ 16] =" ";
    struct in_addr subtemp;
    struct in_addr atemp;
    struct in_addr btemp;
    int ingrp=0;
    // the base list with all entries
    list_start = LL_Create(NULL);
    list_end = LL_Create(NULL);
    // put entries onto base list
    for(i=0; i<SIZE;i++) {
        temp=New(IP_PREFIX);
        temp->ip_addr = strdup(array[ i] .ip_addr);
        temp->mask = strdup(array[ i] .mask);
        temp->ip_addr_bin = ntohl(inet_addr(array[ i] .ip_addr));
        temp->mask_bin = ntohl(inet_addr(array[ i] .mask));
        temp->ip_subnet_bin = temp->ip_addr_bin & temp->mask_bin;
        temp->mask_len = Ip_Prefix_Length (temp->mask_bin);
        LL_Add(list_start, temp);
    }
```

-continued

```
        // print out base list
        printf("\n********** Starting List **********\n");
        LL_Print(list_start, Print);
        printf("\n\n");
        // create lists sorted by ip address per length
        for(i=32; i>0; i--) {
                listarray[ i] = LL_Create(LL_AutoSort, True,
LL_CompareFunction, Compare, NULL);
                temp = LL_GetHead(list_start);
                while(temp!=NULL)
                {
                        if (temp->mask_len==i)
                        {
                                LL_Add(listarray[ i], temp);
                        }
                        temp = LL_GetNext(list_start, temp);
                }
        }
        // perform the algorithm per length, starting with 32 and
working down
        for(i=32; i>0; i--) {
                temp = LL_GetHead(listarray[ i] );
                while(temp!=NULL)
                {
                        // get all values out of LL
                        netbinaddr=temp->ip_addr_bin;
                        maskbinaddr=temp->mask_bin;
                        maskbinaddrback=maskbinaddr;
                        subnetbinaddr=temp->ip_subnet_bin;
                        upsubnetbinaddr=netbinaddr & (maskbinaddr<<1);
                        subtemp.s_addr=htonl(subnetbinaddr);
                        tmp=inet_ntoa(subtemp);
                        strcpy(subnet, tmp);
                        printf("       [ expecting %s] \n\n", expect);
                        printf("Parsing: %s, %s \n", temp->ip_addr, temp-
>mask);
                        if ((ingrp!=0) && (subnetbinaddr!=expectbinaddr)) {
                                // break in group, evaluate
                                printf("\nSingle Group =
%s\n", firstingrouptext);
                                ingrp=0;
                                expectbinaddr=0;
                                strcpy(expect," ");
                                LL_Add(list_end, firstg);
                        }
                        if (ingrp==0) {
                                if (subnetbinaddr!=upsubnetbinaddr) {
                                        // cannot start group so entry is itself
                                        printf("\nSingle Group = %s\n", subnet);
                                        ingrp=0;
                                        expectbinaddr=0;
                                        strcpy(expect, " ");
                                        LL_Add(list_end, temp);
                                }
                                else {
                                        // subnetbinaddr==upsubnetbinaddr
                                        // start new group
                                        printf("\n   New group: %s\n\n", temp-
>ip_addr);
                                        firstg=temp;
                                        firstingroup=subnetbinaddr;
                                        strcpy(firstingrouptext, subnet);
                                        ingrp++;
expectbinaddr=subnetbinaddr+(~maskbinaddrback)+1;
                                        atemp.s_addr=htonl(expectbinaddr);
                                        temp=inet_ntoa(atemp);
                                        strcpy(expect, tmp);
                                }
                        }
                        else {
                                // ingrp!=0
                                if (subnetbinaddr==expectbinaddr) {
                                        // found second group member, should add this
prefix
                                        printf("\n   Group =    %s
%s\n\", firstingrouptext, subnet);
                                        ingrp=0;
                                        expectbinaddr=0;
                                        strcpy(expect, " ");
```

-continued

```
                                        temp2=New(IP_PREFIX);
                                        temp2->ip_addr_bin=firstingroup;
                                        temp2->ip_addr=strdup(firstingrouptext);
                                        temp2->mask_bin=upsubnetbinaddr;
                                        temp2->mask_len=i-1;
                                        subtemp.s_addr=htonl((maskbinaddr<<1));
                                        tmp=inet_ntoa(subtemp);
                                        temp2->mask=strdup(tmp);
                                        LL_Add(listarray[ i-1], temp2);
                                }
                        }
                        temp=LL_GetNext(listarray[ i], temp);
                } //while
        } //for
        // print out list_end
        printf("\n********** Final List **********\n");
        LL_Print(list_end, Print);
} //main
```

While the invention is described in terms of preferred embodiments in a specific system environment, those of ordinary skill in the art will recognize that the invention can be practiced, with modification, in other and different hardware and software environments within the spirit and scope of the appended claims.

What is claimed is:

1. In a data communications network, a method of aggregating a sorted list of IP prefix pairs comprising the steps of:

comparing a prefix pair in a first sub-list to a lowest IP length subnet boundary;

adding the prefix pair to a final list if the prefix pair is not on the lowest IP length subnet boundary and the prefix pair is not a first in pair;

moving the prefix pair to a second sub-list if the prefix pair is on the lowest IP length subnet boundary and the prefix pair is a next expected pair, the second sub-list having an IP prefix length lower than the first sub-list;

continuing the comparing, adding and moving operations for remaining IP prefix pairs of the first sub-list; and repeating the comparing, adding and moving operations for prefix pairs of the second sub-list.

2. The method of claim 1 further comprising repeating the comparing, adding and moving operations for prefix pairs of additional sub-lists associated with the sorted list.

3. The method of claim 1 further comprising the steps of:

outputting a summary local system address (LSA) if one of the remaining prefix pairs is aggregated into an existing area;

otherwise, outputting a separate summary for the one of the remaining prefix pairs.

4. The method of claim 1 further comprising the steps of:

outputting a separate summary for one of the remaining prefix pairs;

marking the one of the remaining prefix pairs; and withdrawing the separate summary and outputting a summary LSA if the marked prefix pair is aggregated into an existing area.

5. A network apparatus comprising:

a comparitor logically coupled to receive a sorted list of IP prefix pairs arranged in a plurality of sub-lists and compare a prefix pair in a first sub-list to a lowest IP length subnet boundary;

a prefix pair adder logically coupled to the comparitor to add the prefix pair to a final list if the prefix pair is not on the lowest IP length subnet boundary and the prefix pair is not a first in pair;

a prefix pair mover logically coupled to the comparitor to move the prefix pair to a second sub-list if the prefix pair is on the lowest IP length subnet boundary and the prefix pair is a next expected pair, the second sub-list having an IP prefix length lower than the first sub-list; and a list selector logically coupled to the comparitor to select a next IP prefix pair of the first sub-list.

6. The apparatus of claim 5 further comprising a sorter logically coupled to the comparitor to sort the plurality of sub-lists based upon IP prefix lengths.

7. The apparatus of claim 5 further comprising a first outputter logically coupled to the comparitor to output a summary local system address (LSA) if one of the remaining prefix pairs is aggregated into an existing area.

8. The apparatus of claim 7 further comprising a second outputter logically coupled to the comparitor to output a separate summary for the one of the remaining prefix pairs.

9. In a data communications network, a method of aggregating a sorted list of IP prefix pairs comprising the steps of:

(a) comparing an IP prefix pair in a first sub-list to a lowest IP length subnet boundary;

(b) adding the IP prefix pair to a final list if the IP prefix pair is not on the lowest IP length subnet boundary and the IP prefix pair is not a first in pair;

(c) moving the IP prefix pair to a second sub-list if the IP prefix pair is on the lowest IP length subnet boundary and the IP prefix pair is a next expected pair;

(d) continuing operations of (a)–(c) for remaining IP prefix pairs of the first sub-list; and (e) repeating operations of (a)–(d) for IP prefix pairs of the second sub-list.

10. The method of claim 9, wherein the second sub-list having IP prefix pairs with IP prefix lengths lower than IP prefix pairs of the first sub-list.

11. The method of claim 9 further comprising repeating operations of (a)–(e) for IP prefix pairs of additional sub-lists associated with the sorted list.

12. A software embodied in a storage device and executed by a processor, the software comprising;

a first software code to compare an IP prefix pair in the list to a lowest IP length subnet boundary;

a second software code to add the IP prefix pair to a final list if the IP prefix pair is not on the lowest IP length subnet boundary and the IP prefix pair is not a first in pair; and a third software code to move the IP prefix pair to a second sub-list if the IP prefix pair is on the lowest IP length subnet boundary and the IP prefix pair is a next expected pair, wherein the operations of the first software code, second software code and the third software code are iterative to be additionally performed on at least IP prefix pairs of the second sub-list.

13. The software of claim 12 wherein the second sub-list having IP prefix pairs with IP prefix lengths lower than IP prefix pairs of the first sub-list.

14. The software of claim 12 embodied in the storage device being a component of a computer.

* * * * *